United States Patent [19]
Sproul

[11] 4,059,023
[45] Nov. 22, 1977

[54] ONE-PIECE SINTERED PULLEY HUB CONSTRUCTION

[75] Inventor: Nolte V. Sproul, Canton, Ohio
[73] Assignee: Aspro, Inc., Canton, Ohio
[21] Appl. No.: 683,740
[22] Filed: May 6, 1976
[51] Int. Cl.² .............................................. F16H 55/36
[52] U.S. Cl. ................................. 74/230.3; 74/230.8
[58] Field of Search .............. 74/230.3, 230.8, 230.01, 74/230.14; 75/200, 226

[56] References Cited

U.S. PATENT DOCUMENTS

| | | | |
|---|---|---|---|
| 3,225,614 | 12/1965 | Skinner et al. | 74/230.01 |
| 3,260,596 | 7/1966 | Rapprich et al. | 75/226 |

FOREIGN PATENT DOCUMENTS

| | | | |
|---|---|---|---|
| 1,292,988 | 12/1962 | Germany | 74/230.3 |

*Primary Examiner*—Edgar W. Geoghegan
*Attorney, Agent, or Firm*—Frease & Bishop

[57] ABSTRACT

A one-piece sintered pulley hub construction formed of powder metal is provided with a pair of radially outwardly extending hub pulling flanges. The hub has a generally tubular-shaped body with front and rear end faces and a cylindrical bore extending axially therebetween. The pulling flanges are formed integrally with the tubular body and extend radially outwardly from adjacent the front end of the tubular body in diametrically opposite directions, with the front surfaces of the flanges preferably lying in the same plane with the front end face of the tubular body. The flanges provide lugs for gripping by a hub pulling device and they enable the hub to be formed in one piece by a powder metal sintering process eliminating costly machining procedures.

11 Claims, 6 Drawing Figures

ONE-PIECE SINTERED PULLEY HUB CONSTRUCTION

BACKGROUND OF THE INVENTION

1. Field of the Invention

The invention relates to a pulley hub for joining with a bottom wall of a sheet metal pulley for mounting the pulley on a shaft. More particularly, the invention relates to a pulley hub which is formed inexpensively of sintered powder metal in a single piece, and which provides a pair of hub pulling flanges thereon.

2. Description of the Prior Art

Many pulley hubs are formed from tubular steel stock which is cut to predetermined axial lengths with the various hub pulling flanges and pulley cup mounting grooves being machined or milled therein. These hub constructions are satisfactory for their intended applications, but the machining required to form such flanges and grooves increase considerably the cost of the hub. Also greater metal thickness is required in the area of the hub at the point of pulley attachment for the formation of such removal tabs and grooves. The removal of this metal by machining to form the required grooves and lugs results in metal scrap waste.

Machining generally is required to form a groove or recess in the hub body to provide a projection on one end of the hub for gripping by a hub puller for removing the hub and connected pulley from a shaft, should replacement be required. Such machining also is required to form flanges, recesses, indentations, etc., for receiving and mounting a sheet metal pulley which is secured thereon by welding, brazing or the like.

Recent years have seen advancements in powder metallurgy and the subsequent production of numerous products including hubs from powder metal by pressing and sintering predetermined quantities and mixtures of such powder metal. Examples of various articles formed from metal powder and methods of producing such articles are illustrated in U.S. Pat. Nos. 2,561,583, 3,260,596, 3,391,444, 3,719,479 and 3,720,512.

Problems, however, have been encountered in attempting to form hubs for pulleys having annular flanges and grooves formed therein by powder metallurgy methods. It is difficult to form an annular groove in the hub body which forms an annular pulling flange due to the difficulty of press forming such an exterior annular groove in the green pressed hub compacts prior to sintering in known press molding equipment.

This problem was eliminated by the two-piece sintered pulley hub construction and method of making the same, disclosed in application Ser. No. 680,427, filed Apr. 26, 1976, which is assigned to the same assignee as this application. Such a two-piece hub construction forms the desired annular pulling groove therein when the two separately molded green compacts are assembled by a unique arrangement of flanges and shoulders formed on the two components. This two-piece arrangement eliminates the forming of an annular groove in a one-piece sintered member which is difficult. This two-piece pulley hub provides a satisfactory solution to a problem, but requires molding of two separate components which then are telescopically joined to form a single member prior to sintering. This procedure and construction increases the number of steps and manipulations required in forming the final pulley hub which increases the final hub cost.

No known pulley hub construction of which I am aware eliminates these difficulties by providing a one-piece sintered powder metal pulley hub structure having a pair of outwardly radially extending flanges or lugs formed thereon, thereby eliminating the formation of any annular groove in the hub body.

SUMMARY OF THE INVENTION

Objectives of the invention include providing a pulley hub construction formed in one piece by sintering a pressure-formed green compact of a powder metal mixture, with the green compact having at least a pair of diametrically opposite, radially outwardly extending flanges adjacent one end thereof; providing such a pulley hub having a generally tubular body which is formed with an annular recess in the end of the tubular body opposite the pulling lugs for receiving an annular mounting flange of a sheet metal pulley cup for securing the cup to the hub; providing such a pulley hub in which an attachment zone is formed on the pulley hub adjacent the pulley cup mounting recess to form an annular surface adjacent an edge of the pulley cup mounting flange for receiving a weld therebetween for joining the pulley cup to the hub; and providing such a hub construction which may be produced inexpensively by known sintering and die press-forming equipment, thereby eliminating expensive machining and material waste, which may be produced simply, conveniently, efficiently and with a variety of physical characteristics by varying the ingredients of the starting powder metal mixture and by varying the compact pressure and sintering temperature thereof, and which pulley hub construction eliminates difficulties existing in the art.

These objectives and advantages are obtained by the one-piece pulley hub construction, the general nature of which may be stated as including a generally tubular-shaped body formed of sintered steel and having front and rear end faces, and a cylindrical bore extending axially between said end faces; said body having first and second cylindrical outer surfaces extending axially between the front and rear end faces, with the first cylindrical surface having a greater axial length and diameter than the second cylindrical surface, and with said first cylindrical surface being adjacent the front end face; a first conical surface, concavely-shaped in cross section, extending between and joining the first and second cylindrical surfaces; a second conical surface extending rearwardly inwardly from the second cylindrical surface and joined with the rear end face of the tubular body; and a pair of pulling lug means formed integral with the tubular-shaped body and extending radially outwardly in diametrically opposite directions from the first cylindrical surface.

BRIEF DESCRIPTION OF THE DRAWING

A preferred embodiment of the invention — illustrative of the best mode in which applicant has contemplated applying the principle — is set forth in the following description and shown in the accompanying drawing, and is particularly and distinctly pointed out and set forth in the appended claims.

Similar numerals refer to similar parts throughout the drawing.

DESCRIPTION OF THE PREFERRED EMBODIMENT

Figure 1:
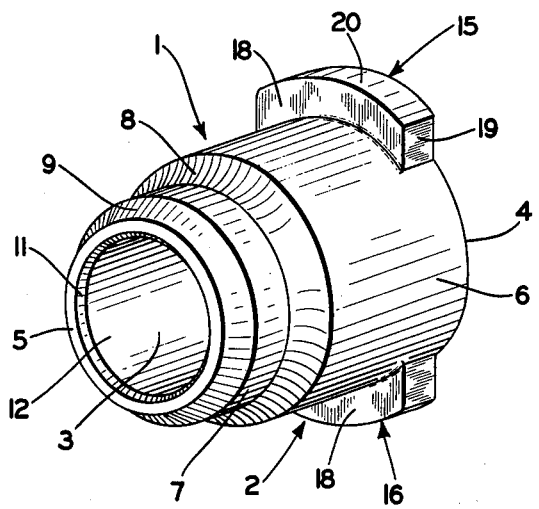
FIG. 1 is an enlarged perspective view of the improved one-piece sintered pulley hub construction.

The improved pulley hub construction is indicated generally at 1 and is shown in FIG. 1. Hub construction 1 has a generally tubular-shaped body 2 with an axial bore 3 extending throughout the length thereof between end faces 4 and 5. Faces 4 and 5 are referred to throughout the following description as front and rear end faces, respectively, for description purposes only.

Figure 2:
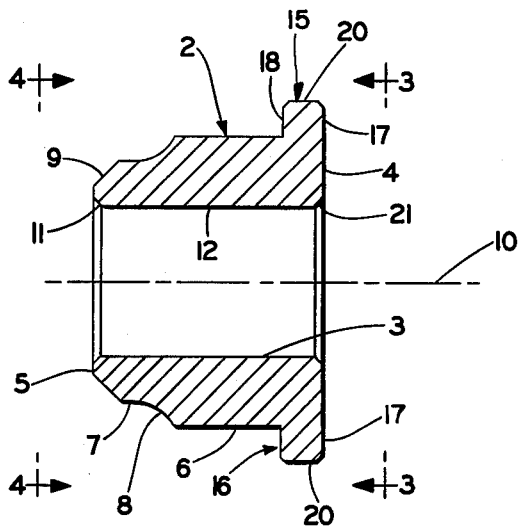
FIG. 2 is a longitudinal sectional view of the hub construction of FIG. 1.

Tubular body 2 includes first and second sections 6 and 7 having outer cylindrical surfaces. Cylindrical section 7 is smaller in both axial length and diameter than cylindrical section 6 and extends rearwardly from and is concentric with respect to section 6. A conical surface 8, concavely shaped in cross section (FIG. 2), integrally connects sections 6 and 7. Cylindrical surface 7 terminates in a rearwardly inwardly extending conical surface 9 which terminates in rear end face 5. End face 5 has an annular ring-like configuraton and lies in a plane normal to the axis 10 of body 2. A reentrant conical surface 11 extends from end face 5 to inner cylindrical surface 12 of body 2 which forms axial bore 3.

In accordance with the invention, a pair of arcuate-shaped lugs 15 and 16 are formed integrally with body 2 and extend radially outwardly in diametrically opposite directions from each other. Lugs 15 and 16 preferably are identical, each having planar, parallel spaced front and rear surfaces 17 and 18, respectively, which are joined by spaced parallel end surfaces 19 and arcuate curved top surfaces 20. Front surfaces 17 of lugs 15 and 16 preferably lie in a common plane with end face 4 of body 2 (FIGS. 2 and 3), which plane is normal to axis 10 and parallel to the plane of rear end face 5. Front end face 4 preferably has a reentrant conical surface 21 which connects end face 4 with bore surface 12.

Figure 3:
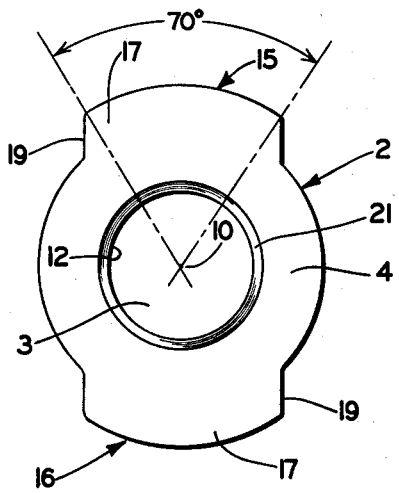
FIG. 3 is a right-hand elevational view looking in the direction of arrows 3—3, FIG. 2.
Figure 4:
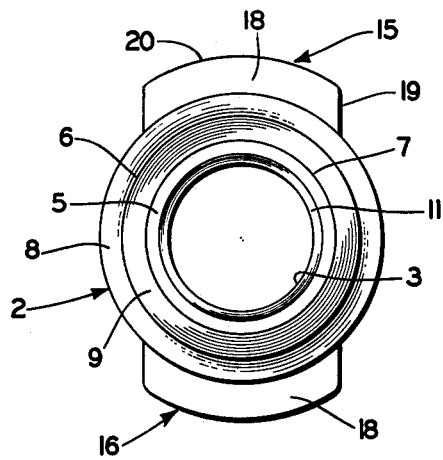
FIG. 4 is a left-hand end elevational view looking in the direction of arrows 4—4, FIG. 2.

Arcuate top surfaces 20 of lugs 15 and 16 preferably are concentric with respect to cylindrical surfaces 6 and 7 and axial bore 3, and each have an arcuate length of approximately 70°, as shown in FIG. 3. The lengths of end surfaces 19, and front and rear surfaces 17 and 18 are approximately 1.2 radians and are in alignment with each other as shown in FIG. 4.

Another of the main features of the invention is the forming of hub construction 1 in a single integral piece of a powder metal mixture. One type of powder metal mixture found suitable for hub 1 consists of iron and carbon in various percentages in the ranges set forth in Designations F-0008-S and F-0008-R of Standard No. 35 of the Metal Powder Industries Federation to form a sintered steel hub. If desired, the powder metal mixture may consist of iron, carbon and small amounts of copper to form a sintered steel, copper impregnated hub. The selected powder metal mixture is placed in a mold having an internal configuration similar to the external configuration of hub 1. This mixture then is pressure-formed in a press into a green compact state having the configuration as shown in FIG. 1. These green compacts then are removed from the die molds and sintered in a furnace forming the integral one-piece hub construction shown in FIGS. 1–4.

Figure 5:
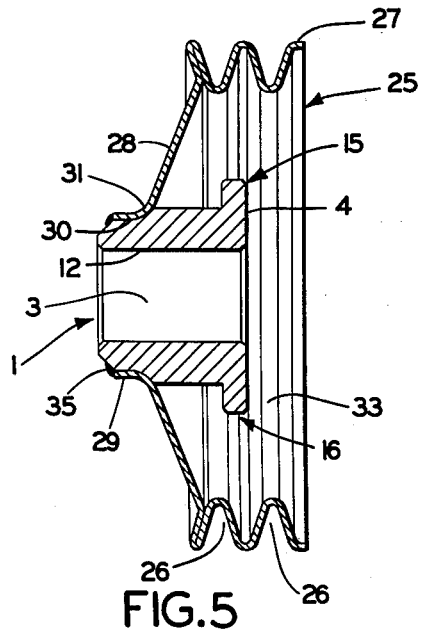
FIG. 5 is a reduced longitudinal sectional view of the improved pulley hub mounted on a V-grooved sheet metal pulley cup.
Figure 6:
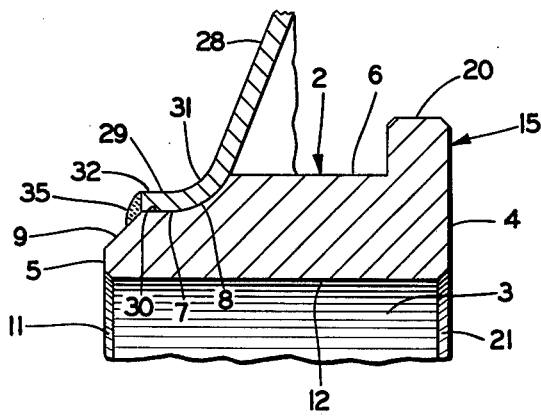
FIG. 6 is an enlarged fragmentary sectional view of a portion of FIG. 5 showing the joining of the pulley cup to the improved pulley hub.

Hub 1 is shown in FIGS. 5 and 6 mounted on a cup-shaped sheet metal pulley 25 which has a plurality of V-grooves 26 roller-spun in an axially extending side wall 27 which is integral with a conical-shaped bottom wall 28. Bottom wall 28 terminates in an annular axially extending flange 29 which defines a central bottom wall opening 30 for telescopically receiving hub 1 therein. Axial flange 29 of pulley cup 25 is integrally joined with conical wall 28 by an annular corner 31 which is complementary to conical surface 8 of hub body 2. Mounting flange 29 of pulley cup 25 has an axial length generally equal to the axial length of cylindrical surface 7 of body 2, whereby annular edge 32 of mounting flange 29 aligns with the junction of cylindrical surface 7 and conical surface 9 (FIG. 6).

Hub 1 is mounted easily on pulley cup 25 by inserting the rear end of hub 1 through the open outer cup end 33 of cup side wall 27 and through central opening 30 formed by mounting flange 29. Annular flange 29 has an internal diameter generally equal to the external diameter of cylindrical hub surface 7, whereby mounting flange 29 lies in closely aligned abutting relationship with surface 7 as shown in FIG. 6 with annular corner 31 of cup 25 being complementary to and in alignment with conical surface 8 of hub 1.

Pulley cup 25 preferably will be secured to hub 1 by an annular weld 35 which extends between edge 32 of mounting flange 29 and conical surface 9 of tubular body 2. Weld 35 traps mounting flange 29 between conical surface 8 of body 2 and weld 35. Cup flange 29 also may be secured to cylindrical surface 7 and conical surface 8 which form an annular mounting zone for the pulley cup, by brazing, depending upon the composition of tubular body 2. Hub 1, when mounted on cup 25, is located within and concentric with cup side wall 27 (FIG. 5) with only end face 5 and a very small portion of conical surface 9 projecting outwardly from bottom wall opening 30.

It may be desirable for certain applications to form tubular body 1 with more than a pair of lugs 15 and 16. For example, three lugs equally spaced around the circumference of cylindrical surface 6 would provide the same effect and be within the concept of the invention. Likewise, a single annular pulling flange, similar to flanges 15 and 16 could extend completely about cylindrical section 6 of body 2. However, for most applications a pair of flanges as shown in the drawings and described above, is sufficient and maintains the amount of powder metal required for each hub produced at a minimum.

Another advantage of the construction described above is the providing of a sufficiently large annular area formed by conical surface 9 and cup edge 32 for securing cup 25 on hub 1 by a simple circular welding procedure. Conical surface 8 assists in strengthening the connection between cup 25 and hub 1 by trapping cup mounting flange 29 between surface 8 and the welding connection controlling axial movement of the pulley cup with respect to the hub.

Improved hub construction 1 provides a one-piece integral hub formed of powder metal having pulling lugs formed thereon without requiring any grooves for forming the same which is difficult in sintered powder metal products. Likewise, machining and metal waste is eliminated in forming the pulling lugs as occurs when formed from usual bar stock. Hub construction 1 further provides a reduced metal thickness in the pulley cup mounting zone formed by surfaces 7 and 8 as shown in FIG. 6. Such reduction is possible due to the elimination of machining annular grooves or tabs therein as in prior pulley hub constructions formed from metal bar stock.

Accordingly, the present invention provides improvements in the art of making a pulley hub construction and the mounting of such hub on a sheet metal pulley cup which satisfies the various objectives set forth above, which solves problems and satisfies demands existing in the art and which obtains the new results indicated.

In the foregoing description, certain terms have been used for brevity, clearness and understanding; but no necessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the one-piece sintered hub construction is constructed and used, the characteristics of the construction, and the advantageous, new and useful results obtained; the new and useful structures, devices, elements, arrangements, parts, and combinations, are set forth in the appended claims.

I claim:

1. A one-piece pulley hub construction including:
   a. a generally tubular-shaped body formed of sintered steel and having front and rear end faces, and a cylindrical bore extending axially between said end faces;
   b. said body having first and second cylindrical outer surfaces extending axially between the front and rear end faces, with the first cylindrical surface having a greater axial length and diameter than the second cylindrical surface, and with said first cylindrical surface being adjacent the front end face;
   c. a first conical surface, concavely-shaped in cross section, extending between and joining the first and second cylindrical surfaces;
   d. a second conical surface extending rearwardly inwardly from the second cylindrical surface and joined with the rear end face of the tubular body; and
   e. a pair of pulling lug means formed integral with the tubular-shaped body and extending radially outwardly in diametrically opposite directions from the first cylindrical surface.

2. The construction defined in claim 1 in which the front end face of the tubular body is planar and extends normal to the axis of said tubular body.

3. The construction defined in claim 2 in which the lug means has front and rear faces; and in which said front faces are planar and lie in a common plane with the front end face of the tubular body normal to the axis of said tubular body.

4. The construction defined in claim 1 in which the lug means each have an arcuate outer surface concentric to the axis of the tubular body.

5. A pulley hub construction including:
   a. a one-piece hollow tubular body formed of sintered powder metal having first and second ends and an axial bore extending throughout the length of said body between said ends;
   b. a plurality of radially outwardly extending lug means formed on the tubular body adjacent the first end thereof and equally spaced circumferentially with respect to each other, said lug means being formed of sintered powder metal integral with said tubular body; and
   c. the second end of the tubular body being formed with an annular pulley cup mounting zone, with said zone having a reduced metal thickness and a smaller outer diameter than the first end of said tubular body.

6. The construction defined in claim 5 in which the lug means includes a pair of lugs mounted diametrically opposite of each other.

7. The construction defined in claim 5 in which the first end of the tubular body has an annular planar end face normal to the axis of said tubular body; and in which the lug means each has a planar end surface lying in the same plane as said tubular body end face.

8. The construction defined in claim 5 in which the first end of the tubular body has a first cylindrical surface formed integral with the lug means; in which the second end has a second cylindrical surface integrally joined with said first cylindrical surface by a conical surface concavely-shaped in cross section; and in which said second cylindrical surface and the conical surface form the pulley cup mounting zone.

9. A pulley construction including:
   a. a sheet metal pulley cup having a bottom wall and a generally axially extending side wall, with said bottom wall having flange means defining an opening in the bottom wall;
   b. a one-piece hollow tubular hub body formed of sintered powder metal having an axial bore extending throughout the length of said body;
   c. a plurality of radially outwardly extending lug means formed on the tubular body adjacent one end thereof and equally spaced circumferentially with respect to each other, said lug means being formed of sintered powder metal integral with said tubular body;
   d. an annular pulley cup mounting zone formed in the tubular body adjacent the other end thereof, said zone having a reduced metal thickness and smaller diameter than said one end of the tubular body;
   e. the tubular body being telescopically received within the bottom wall opening of the pulley cup with the bottom wall opening flange means being engaged with the annular mounting zone of the tubular body; and
   f. means joining the pulley cup opening flange to the tubular body, with the tubular body lug mans being located within the interior of the cup side wall.

10. The construction defined in claim 9 in which the bottom wall opening flange means terminates in an annular generally radially extending edge; in which the joining means is an annular weld; and in which said weld extends between said flange edge and the annular mounting zone of the tubular body.

11. The construction defined in claim 9 in which the lug means includes a pair of lugs extending diametrically radially outwardly from each other; and in which said lugs each have an arcuate top surface concentric with the axis of the tubular body.

* * * * *

UNITED STATES PATENT AND TRADEMARK OFFICE
CERTIFICATE OF CORRECTION

PATENT NO. : 4,059,023
DATED : November 22, 1977
INVENTOR(S) : Nolte V. Sproul

It is certified that error appears in the above-identified patent and that said Letters Patent are hereby corrected as shown below:

Column 3, line 20, change "description" to -descriptive-

Column 5, line 17, change "necessary" to -unnecessary-

Column 6, line 56, change "mans" to -means-

Signed and Sealed this

Twenty-eighth Day of February 1978

[SEAL]

Attest:

RUTH C. MASON
Attesting Officer

LUTRELLE F. PARKER
Acting Commissioner of Patents and Trademarks